P. STALDER.
CHOCOLATE COOLER.
APPLICATION FILED DEC. 2, 1915.

1,221,918.

Patented Apr. 10, 1917.
2 SHEETS—SHEET 1.

WITNESSES:
Umleonway.
C. R. Ziegler.

INVENTOR
Paul Stalder,
BY Joshua R. H. Potts.
HIS ATTORNEY

P. STALDER.
CHOCOLATE COOLER.
APPLICATION FILED DEC. 2, 1915.
1,221,918.
Patented Apr. 10, 1917.
2 SHEETS—SHEET 2.
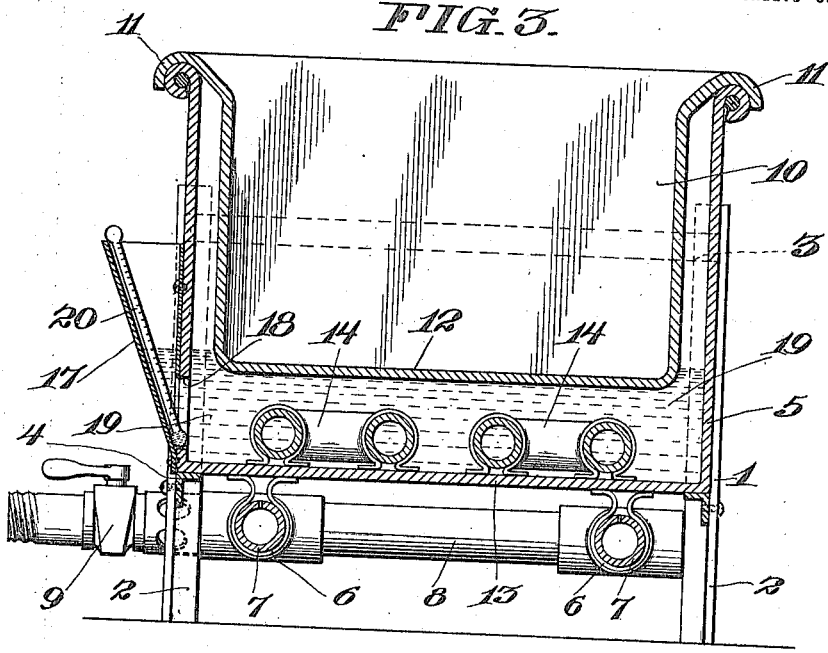
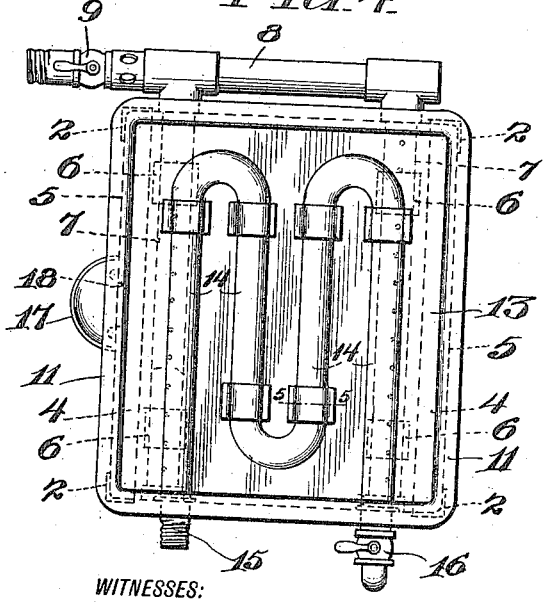
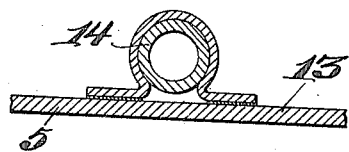
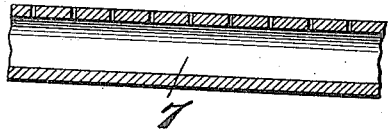
WITNESSES:
Wm Leonury.
C. R. Ziegler.
INVENTOR
Paul Stalder,
BY Joshua R. H. Potts.
HIS ATTORNEY

UNITED STATES PATENT OFFICE.

PAUL STALDER, OF PHILADELPHIA, PENNSYLVANIA.

CHOCOLATE-COOLER.

1,221,918.  Specification of Letters Patent.  Patented Apr. 10, 1917.

Application filed December 2, 1915. Serial No. 64,682.

*To all whom it may concern:*

Be it known that I, PAUL STALDER, a citizen of the United States, residing at Philadelphia, in the county of Philadelphia and State of Pennsylvania, have invented certain new and useful Improvements in Chocolate-Coolers, of which the following is a specification.

My invention relates to improvements in chocolate coolers, the object of the invention being to provide a receptacle in which chocolate or other material can be maintained at any desired temperature for any length of time.

While I refer to my invention as a "chocolate cooler," it is to be understood that I do not limit myself to this term, but use this term to define an apparatus in which a liquid is maintained at a desired temperature and which is especially adapted for chocolate as it is difficult to keep chocolate at a uniform temperature, and which is of the utmost importance in the manufacture of candy and similar goods.

A further object is to provide a cooler of the character stated which can be manufactured and sold at a reasonably low price, and which can be easily operated to give the most efficient results.

With these and other objects in view, the invention consists in certain novel features of construction and combinations and arrangements of parts as will be more fully hereinafter described and pointed out in the claims.

In the accompanying drawings:

Fig. 3 is a view in vertical transverse section on the line 3—3 of Fig. 2.

Fig. 4 is a top plan view on a reduced scale, the chocolate receptacle 10 being removed.

Fig. 5 is a view in section on an enlarged scale on the line 5—5 of Fig. 4.

Fig. 6 is a fragmentary view in longitudinal section through one of the gas pipes 7.

Figure 1:
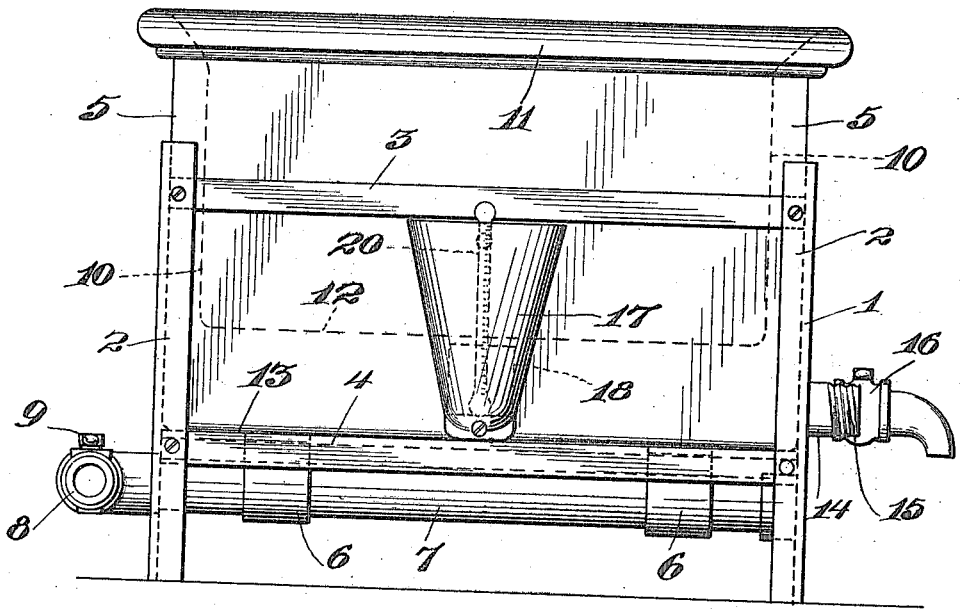
Figure 1 is a view in side elevation illustrating my improved chocolate cooler.
Figure 2:
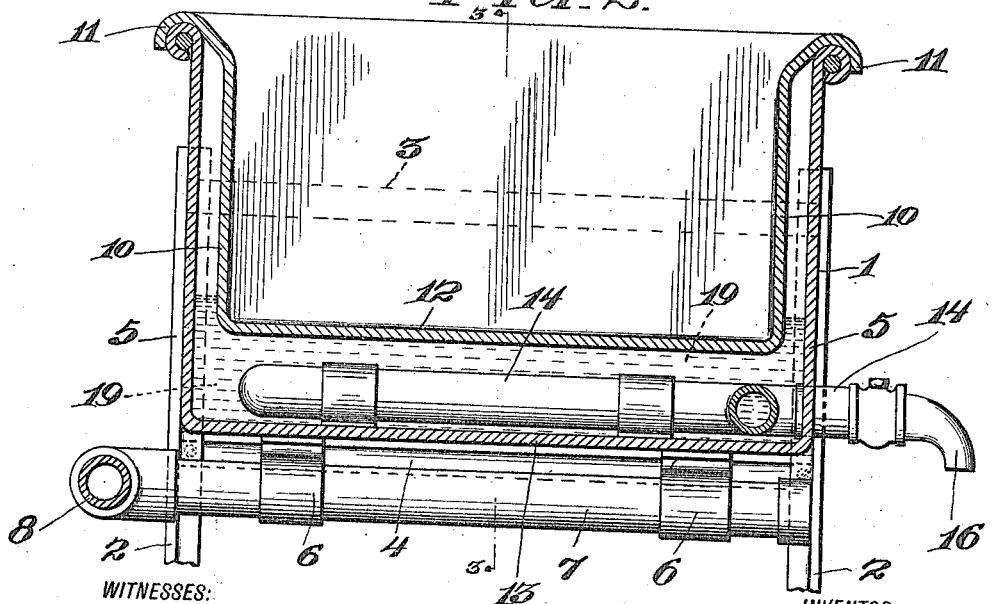
Fig. 2 is a view in vertical longitudinal section through the center of the cooler.

1 represents a skeleton frame which is of general rectangular shape, and which is provided with angle bars 2 at its corners constituting posts supporting the frame. The angle bars 2 are connected by horizontal bars 3 and 4, the latter preferably angle bars and serving as supports for a removable casing 5.

The casing 5 is provided on its bottom face with supporting straps 6 in which perforated gas burner tubes 7 are located. These tubes at one end, are connected to a supply pipe 8, having a valve 9 controlling the flow of gas to the burner tubes.

10 is a chocolate receptacle which is located within casing 5, and is preferably provided at its upper edge with an outwardly projecting lip 11 resting on the upper edge of casing 5. The chocolate receptacle 10 is narrower and shorter than casing 5, so that it is spaced from the casing at all four sides, and said receptacle 10 is also appreciably shallower than casing 5, so that the bottom 12 of the receptacle 10 is spaced above the bottom 13 of casing 5.

On the bottom 13 of casing 5, I secure a cooling pipe 14 which may be made in various ways, but preferably consists of a plurality of runs having both ends of said cooling pipe projecting through one end of casing 5.

One end of the cooling pipe 14 is provided with a nipple 15 adapted to be connected by a hose (not shown) with any suitable supply of cold water, and on the other end of the cooling pipe, a cock 16 is located to regulate the flow of water from the pipe.

On one side of the casing 5, an inlet spout 17 is provided which communicates with an opening 18 in the side wall of the casing, so that water indicated at 19 may be supplied to the casing from time to time as desired. This spout 17 also operates as a support for a thermometer 20 to indicate the temperature of the water.

It will be noted that casing 5 supports the heater below the bottom 13, and supports the cooler 14 on top of the bottom 13. When casing 5 is provided with a certain amount of water, this water can be maintained at any desired temperature by regulating the supply of gas to the burner tubes 7, and by regulating the flow of cold water through the cooling pipe 14. The chocolate, therefore, in the receptacle 10 can be maintained at any desired temperature for any length of time without any danger of fluctuations in temperature which would be injurious to the product especially when the chocolate is used in the manufacture of candy.

With my improvements, therefore, the chocolate in the receptacle 10 is ready for continuous use in the manufacture of candy, and the operator with but very slight attention on his part, is assured of a uniform product.

If desired, the chocolate can be melted in the receptacle by using the gas burners to bring the receptacle to the necessary temperature. After the chocolate is melted, cold water can be run through the cooling pipe 14, and if desired, this water can be returned to the casing 5 by pouring the same or directing the same through the spout 17. In this manner the chocolate can be cooled off in a reasonably short time, and by regulating the gas and flow of water, the chocolate can be maintained at any desired temperature.

When it is desired, the several parts can be separated and thoroughly cleansed, and the entire cooler can be manufactured and sold at a reasonably low price, supplying the demand in the trade at a very reasonable expense.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An apparatus of the character described, comprising a supporting frame, a casing removably seated in the frame, a receptacle removably suspended in the casing and spaced therefrom, a heater below the casing, and a cooler inside the casing, said casing having an opening therein adjacent its bottom, and means forming a passage leading to said opening, substantially as described.

2. An apparatus of the character described, comprising a supporting frame, a casing removably seated in the frame, a receptacle removably suspended from the upper edge of the casing and spaced therefrom at its sides and bottom, a heater secured below the bottom of the casing, and a cooler positioned within the casing below the receptacle, said casing having an opening therein adjacent its bottom, and a spout leading upwardly from said opening, substantially as described.

3. An apparatus of the character described, comprising a supporting frame structure, a casing removably seated in the frame, a receptacle removably suspended from the upper edge of the casing and spaced therefrom at its sides and bottom, and a heater secured to the lower face of the bottom of the casing and having a portion projecting outwardly through an opening in the supporting frame, and a cooler secured to the upper face of the bottom of the casing and having a portion projecting through an opening in the supporting frame, whereby the receptacle may be bodily lifted from the casing and the casing may be bodily lifted from the supporting frame, substantially as described.

4. An apparatus of the character described, comprising a supporting frame, a casing removably seated in the frame, a receptacle removably suspended from the upper edge of the casing and spaced therefrom at its sides and bottom, a heater secured below the bottom of the casing, a cooler positioned within the casing below the receptacle, said casing having an opening adjacent its bottom, an inclined spout secured to the side of the casing and having its interior in communication with said latter opening, the top edge of said spout being at a higher level than the top of the opening, said spout forming means for supplying water to the casing and as a means for inserting a thermometer to ascertain the temperature of the water, substantially as described.

In testimony whereof I have signed my name to this specification in the presence of two subscribing witnesses.

PAUL STALDER.

Witnesses:
  CHAS. H. JONES,
  CHAS. E. POTTS.

Copies of this patent may be obtained for five cents each, by addressing the "Commissioner of Patents, Washington, D. C."